US009511762B2

(12) United States Patent
Ooshima et al.

(10) Patent No.: US 9,511,762 B2
(45) Date of Patent: Dec. 6, 2016

(54) CONTROL DEVICE FOR AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Kenichi Ooshima, Isehara (JP); Hiroki Matsui, Ebina (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 14/764,493

(22) PCT Filed: Nov. 14, 2013

(86) PCT No.: PCT/JP2013/080736
§ 371 (c)(1),
(2) Date: Jul. 29, 2015

(87) PCT Pub. No.: WO2014/119088
PCT Pub. Date: Aug. 7, 2014

(65) Prior Publication Data
US 2015/0360682 A1   Dec. 17, 2015

(30) Foreign Application Priority Data

Jan. 31, 2013  (JP) .................. 2013-016741

(51) Int. Cl.
*B60W 20/00*  (2016.01)
*B60K 6/48*  (2007.10)
(Continued)

(52) U.S. Cl.
CPC .............. *B60W 20/40* (2013.01); *B60K 6/387* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| 5,741,203 | A  | 4/1998 | Nishio |
| 6,081,042 | A  | 6/2000 | Tabata et al. |
| 2012/0109439 | A1 | 5/2012 | Akebono et al. |

FOREIGN PATENT DOCUMENTS

| EP | 2 447 122 A2 | 5/2012 |
| JP | 8-338519 A  | 12/1996 |

(Continued)

*Primary Examiner* — Thomas Tarcza
*Assistant Examiner* — Garrett Evans
(74) *Attorney, Agent, or Firm* — Foley & Lardner LLP

(57) ABSTRACT

There is provided a control apparatus for an automatic transmission AT into which driving forces from driving sources including an engine Eng and a motor/generator MG are inputted. The control apparatus includes: a second brake B2 engaged in a D range; an engagement start determining section (steps S2→S3→S4); and a determination inhibit section (steps S2→S5→S6). The engagement start determining section determines that second brake B2 has started the engagement in a case where a load of the motor/generator MG is increased by a predetermined quantity during the revolution number control and when the D range is selected and second brake B2 in the release state is engaged. The determination inhibit section inhibits the engagement start determination in a case where a switching from an HEV mode to an EV mode occurs.

11 Claims, 8 Drawing Sheets

(51) Int. Cl.
*B60K 6/547* (2007.10)
*B60W 10/115* (2012.01)
*B60W 30/18* (2012.01)
*B60K 6/387* (2007.10)
*B60W 10/02* (2006.01)
*B60W 10/08* (2006.01)
*F16H 61/04* (2006.01)

(52) U.S. Cl.
CPC .............. *B60W 10/02* (2013.01); *B60W 10/08* (2013.01); *B60W 10/115* (2013.01); *B60W 20/00* (2013.01); *B60W 30/18027* (2013.01); *B60W 2510/0208* (2013.01); *B60W 2510/06* (2013.01); *B60W 2510/1005* (2013.01); *B60W 2510/1015* (2013.01); *B60W 2710/021* (2013.01); *B60W 2710/081* (2013.01); *B60Y 2300/427* (2013.01); *F16H 2061/0488* (2013.01); *Y02T 10/6221* (2013.01); *Y10S 903/914* (2013.01); *Y10S 903/946* (2013.01)

(56) References Cited

FOREIGN PATENT DOCUMENTS

| | | |
|---|---|---|
| JP | 9-322312 A | 12/1997 |
| JP | 2005-333713 A | 12/2005 |
| JP | 2009-190584 A | 8/2009 |

AT

| | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

CONTROL DEVICE FOR AUTOMATIC TRANSMISSION

TECHNICAL FIELD

The present invention relates to a control apparatus for an automatic transmission into which driving forces from driving sources including an engine and a motor are inputted.

BACKGROUND ART

Conventionally, an apparatus is known in which an automatic transmission is equipped in a drive train and in which a time point at which a load of a motor/generator which performs a revolution number control driven at a predetermined target revolution number is increased by a predetermined quantity is determined to be a time point at which a clutch engaged in a traveling range has started an engagement (refer to Patent Document 1).

In the conventional apparatus, during a mode switching from an HEV mode in which both driving forces of the engine and the rotor/generator are inputted to an input shaft of the automatic transmission to an EV mode in which the driving force of only the motor generator is inputted to the automatic transmission, an engine stop process and a separation process between the engine and the motor/generator (CL1 release) are carried out.

However, during the switching from the HEV mode to the EV mode at which these processes are carried out, the load of the motor/generator during a revolution number control in which a revolution number of the input shaft of the automatic transmission provides a target revolution number is varied regardless of an engagement state of the clutch engaged in a traveling range. Hence, when the above-described mode switching occurs before a determination of the engagement start of the clutch, the load variation of the motor/generator which occurs due to the mode switching is erroneously determined to be the engagement start of the clutch. This is a task of the present invention.

PRE-PUBLISHED DOCUMENT

Patent Document

Patent document 1: A Japanese Patent Application Publication (Tokkai) 2009-190584.

DISCLOSURE OF THE INVENTION

It is an object of the present invention to provide a control apparatus for an automatic transmission which prevents a load variation of the motor which occurs due to the switching from the HEV mode to the EV mode from an erroneous determination of the engagement start of a frictional engagement element.

A control apparatus for an automatic transmission according to the present invention is the control apparatus for the automatic transmission into which driving forces from driving sources including an engine and a motor are inputted. The control apparatus for the automatic transmission includes: a frictional engagement element engaged in a traveling range; engagement start determining means; and determination inhibit means.

The engagement start determining means determines that the frictional engagement element has started the engagement in a case where a load of the motor is increased by a predetermined quantity during a revolution number control in which a revolution number of an input shaft of the automatic transmission is controlled to be a predetermined target revolution number and when the traveling range is selected and the frictional engagement element in a release state is engaged.

The determination inhibit means inhibits the determination by the engagement start determining means before the determination that the frictional engagement element has started the engagement and in a case where the switching from an HEV mode in which the driving forces of the engine and the motor are inputted to the input shaft to an EV mode in which the driving force of only the motor is inputted to the input shaft occurs.

Thus, before the determination that the frictional engagement element has started the engagement and in a case where the mode switching from the HEV mode to the EV mode occurs, the determination inhibit means inhibits the determination by the engagement start determining means.

That is to say, the engagement start determining means determines that the frictional engagement element has started the engagement during the revolution number control of the input shaft of the automatic transmission and in a case where the load of the motor is increased by the predetermined quantity when the frictional engagement element in the release state is engaged, with the traveling range selected.

However, in a case where the switching occurs from the HEV mode to the EV mode, the engine stop process and the separation process between the engine and the motor are carried out so that the load of the motor is varied. In this way, in a case where, when the traveling range is selected and the frictional engagement element is engaged, the switching from the HEV mode to the EV mode is intervened. In this case, the load variation of the motor generated due to the engine stop process and so forth is erroneously determined to be the load variation due to the engagement start of the frictional engagement element. Therefore, when the switching from the HEV mode to the EV mode occurs, the engagement start determination of the frictional engagement element due to the load variation of the motor is not carried out, Consequently, the load variation of the motor which occurs due to the switching from the HEV mode to the EV mode can be prevented from the erroneous determination of the engagement start of the frictional engagement element.

EMBODIMENTS FOR CARRYING OUT THE INVENTION

Figure 1:
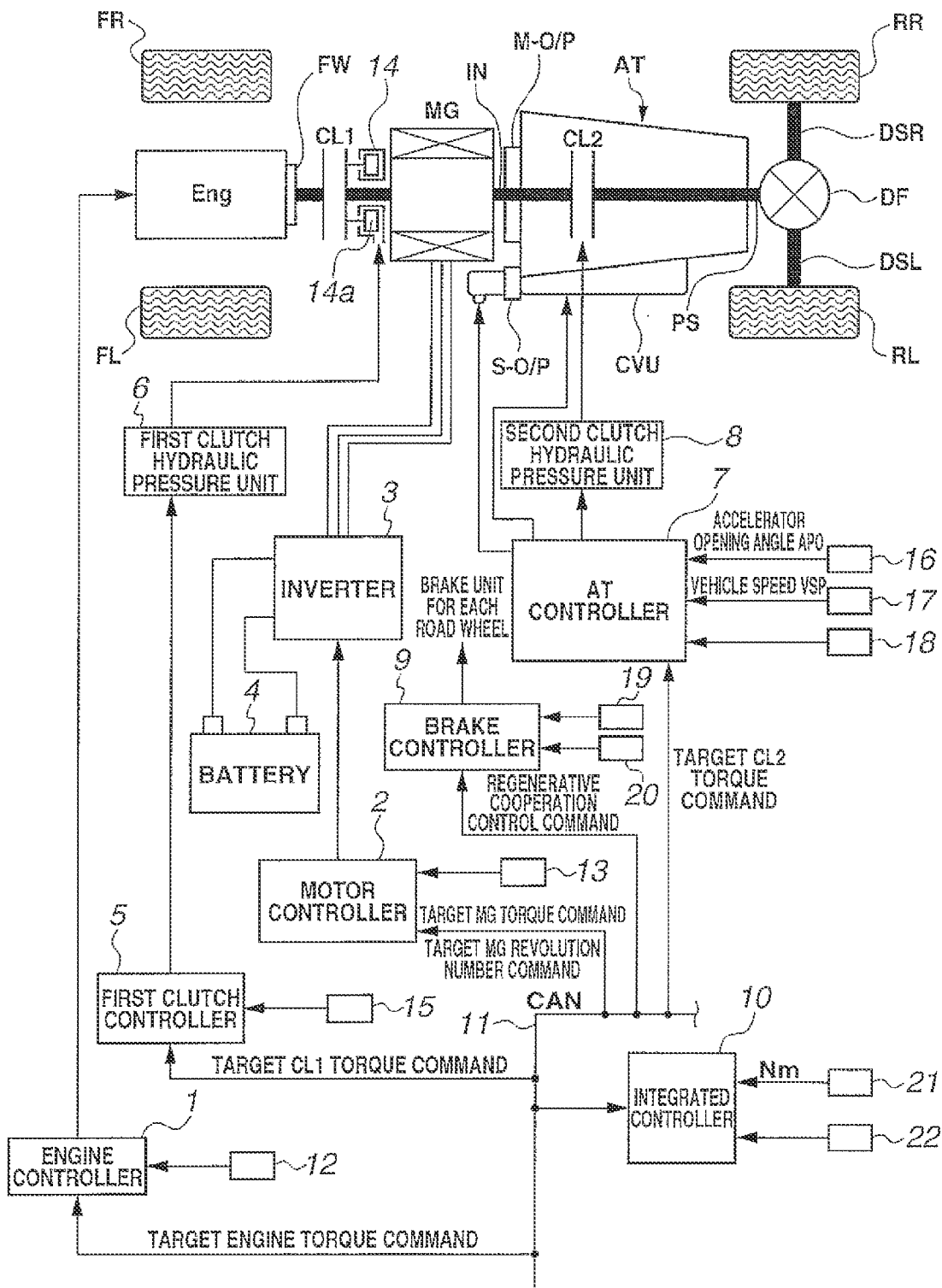
FIG. 1 is a whole system configuration view representing an FR hybrid vehicle (an example of a vehicle) in a rear wheel drive system to which a control apparatus for an automatic transmission in a first preferred embodiment is applied.

Best embodiments for realizing a control apparatus for an automatic transmission according to the present invention will be explained on a basis of first, second, and third preferred embodiments shown in the drawings.

First Embodiment

First, a structure will be explained.

The control apparatus for the automatic transmission in the first embodiment will be explained dividing it into "whole system configuration" "detailed structure of the automatic transmission" "detailed structure of N→D selecting control process", and "detailed structure of an inhibit flag setting process".

[Whole System Configuration]

Figure 2:
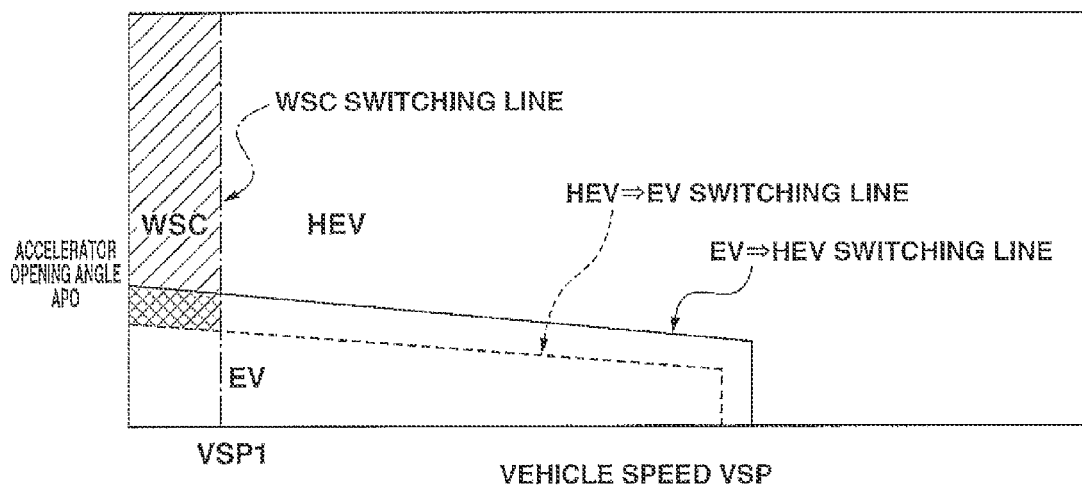
FIG. 2 is a map view representing an EV-HEV selection map set in a mode selection section of an integrated controller in the first preferred embodiment.

FIG. 1 shows an FR hybrid vehicle of a rear road wheel drive to which the control apparatus for the automatic transmission in the first embodiment is applied. FIG. 2 shows an example of an EV-HEV selection map set in a mode selection section of an integrated controller 10. Hereinafter, the whole system configuration will be explained on a basis of FIGS. 1 and 2.

A drive train of the FR hybrid vehicle, as shown in FIG. 1, includes: an engine Eng; a first clutch CL1; a motor/generator MG (motor); a second clutch CL2; an automatic transmission AT; a transmission input shaft IN; a propeller shaft PS; a differential DF; a left drive shaft DSL, a right drive shaft DSR; a left rear road wheel RL (drive wheel); and a right rear road wheel RR (drive wheel). It should be noted that M-O/P denotes a mechanical oil pump, S-O/P denotes an electrical oil pump, FL denotes a front left road wheel, and FW denotes a flywheel.

First clutch CL1 is an engagement element interposed between engine Eng and motor/generator MG and is, so-called, a normal close clutch of a type wherein an engagement state is produced by a biasing force of a diaphragm spring or so forth when a CL1 hydraulic pressure is not applied and a release state is produced by adding the CL1 hydraulic pressure against this biasing force.

Automatic transmission AT is a stepwise multistage transmission in which gear shift stages of forward 7 speeds/reverse 1 speed are automatically switched in accordance with a vehicle speed, an accelerator opening angle, and so forth.

Second clutch CL2 is intervened between motor/generator MG and left and right rear road wheels RL, RR. As second clutch CL2, a new addition as an exclusive use clutch independent of the automatic transmission is not used but one frictional engagement element (a clutch or a brake) to shift automatic transmission AT is used. That is to say, from among a plurality of frictional engagement elements engaged at the respective shift stages of automatic transmission AT, one of the frictional engagement elements which is selected as an element which conforms to an engagement condition or so forth serves as second clutch CL2. It should be noted that a first clutch hydraulic pressure unit 6 and a second clutch hydraulic pressure unit 8 are incorporated into an AT hydraulic pressure control valve unit CVU additively installed in automatic transmission AT.

This FR hybrid vehicle, as modes according to a difference in a drive form, includes: an electric automotive vehicle mode (hereinafter, referred to as "EV mode"); a hybrid vehicle mode (hereinafter, referred to as "HEV mode"); and a drive torque control mode (hereinafter, referred to as "WSC mode".

The above-described "EV mode" is a mode in which first clutch CL1 is released and the driving source is only motor/generator MG and includes a motor drive mode (motor power running) and a generator power generation mode (a generator regeneration). This EV mode is selected, for example, when a demanded driving force is low and a battery SOC is secured.

The above-described "HEV mode" is a mode in which first clutch CL1 is in an engagement state and the driving sources are engine Eng and motor/generator MG and includes: a motor assistance mode (motor power running); an engine power generating mode (a generator regeneration); and a deceleration regenerative power generation mode (the generator regeneration). This "HEV mode" is selected, for example, when the demanded driving force is high or when the battery SOC is insufficient.

The above-described "WSC mode" is the "HEV mode" in the drive form. However, the WSC mode is a mode in which motor/generator MG is revolution number controlled so that, while second clutch CL2 is maintained in a slip engagement state, a torque transmission capacity of second clutch CL2 is controlled. The torque transmission capacity of second clutch CL2 is controlled so that the driving force transmitted through second clutch CL2 becomes the demanded driving force appearing in an accelerator manipulated variable of a driver. This "WSC mode" is selected in a region in which an engine revolution number is below an idling revolution number in such a case where the vehicle is started in the "HEV mode" selection state.

A control system of the FR hybrid vehicle, as shown in FIG. 1, includes: an engine controller 1; a motor controller 2; an inverter 3; a battery 4; a first clutch controller 5; a first clutch hydraulic pressure unit 6; an AT controller 7; a second clutch hydraulic pressure unit 8; a brake controller 9; and an integrated controller 10.

Each controller 1, 2, 5, 7, 9 and integrated controller 10 are connected via a CAN communication line 11 through which an information exchange is mutually possible. It should be noted that a reference numeral 12 denotes an engine revolution number sensor, a reference numeral 13 denotes a resolver, a reference numeral 15 denotes a first clutch stroke sensor which detects a stroke position of a piston 14a of a hydraulic pressure actuator 14, a reference numeral 19 denotes a road wheel speed sensor, and a reference numeral 20 denotes a brake stroke sensor.

AT controller 7 inputs an information from an accelerator opening angle sensor 16, a vehicle speed sensor 17, an inhibitor switch 18 detecting a selected range position (an N range, a D range, an R range, a P range, and so forth). Then, during a traveling with the D range selected, an optimum gear shift stage is searched from a position of a driving point determined according to accelerator opening angle APO and vehicle speed VSP present on a shift map (refer to FIG. 5) and a control command to achieve the searched gear shift stage is outputted to AT hydraulic pressure control valve unit CVU. In addition to this shift control, AT controller 7 performs an engagement/slip/release control for first clutch CL1 and second clutch CL2 on a basis of commands from integrated controller 10.

Integrated controller 10 manages a consumption energy of the whole vehicle and plays a role of running the vehicle at a maximum efficiency. Integrated controller 10 inputs a required information from a motor revolution number sensor 21 detecting a motor revolution number Nm and other sensors and switches 22 and an information via CAN communication line 11. This integrated controller 10 includes a mode selection section which selects the searched mode from the position at which the driving point determined according to accelerator opening angle APO and vehicle speed VSP is present on an EV-HEV selection map shown in FIG. 2 as a target mode. Then, when a mode switching from "EV mode" to "HEV mode" is carried out, an engine start control is carried out. In addition, when the mode switching from "HEV mode" to "EV mode" is carried out, an engine stop control is carried out. In this engine stop control, an CL1 release process in which the CL1 hydraulic pressure is applied to first clutch CL1 engaged in the "HEV mode" and an engine stop process in which a separated engine Eng due to the release of first clutch CL1 is stopped are carried out.

[Detailed Structure of the Automatic Transmission]

Figure 3:
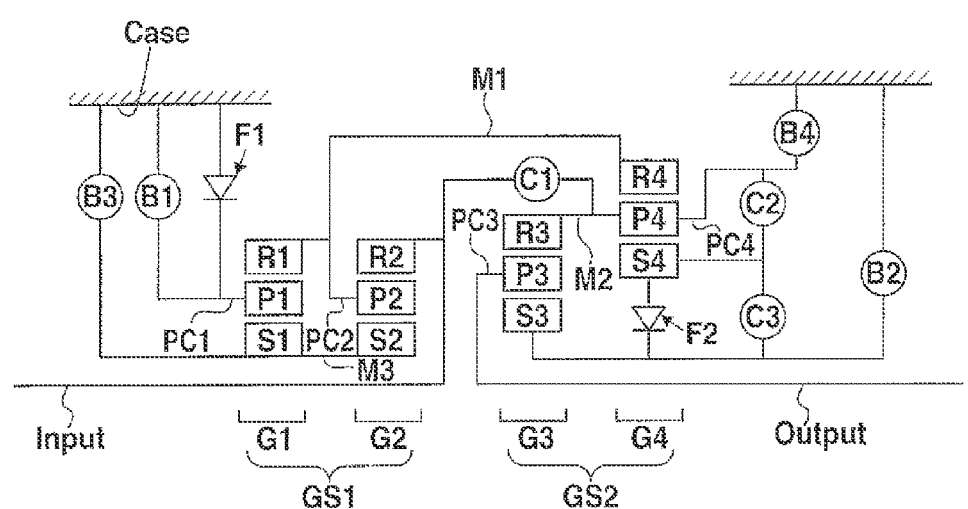
FIG. 3 is a skeleton view representing one example of the automatic transmission in which a frictional engagement element is equipped which is an object of a stroke learning control in the control apparatus for the automatic transmission in the first preferred embodiment.

FIG. 3 shows a skeleton view of an example of automatic transmission AT in the first preferred embodiment.

Figures 4, 5:
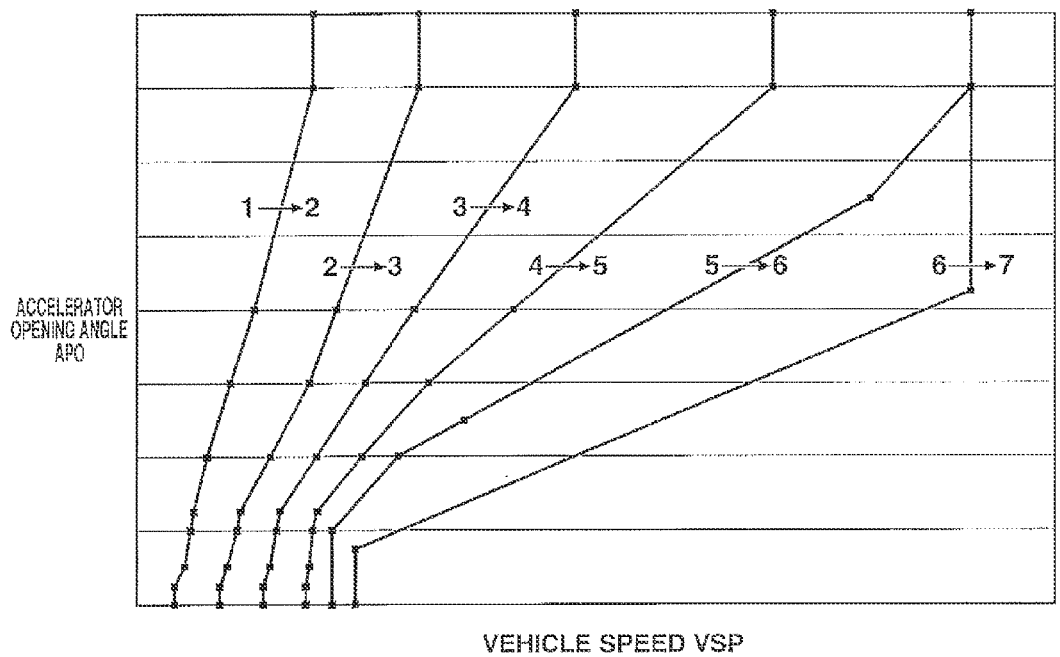
FIG. 4 is an engagement operation table representing an engagement state of each frictional engagement element for each of gear shift stages in the automatic transmission in the first embodiment.
FIG. 5 is a map view representing one example of a shift map of the automatic transmission set in an AT controller in the first preferred embodiment.

FIG. 4 shows engagement states of the respective frictional engagement elements for the respective shift stages in automatic transmission AT.

FIG. 5 shows an example of a shift map of automatic transmission AT set in AT controller 7.

The detailed structure of automatic transmission AT will be explained on a basis of FIGS. 3 through 5.

Automatic transmission AT is the stepwise multistage transmission of the forward 7 speeds and reverse 1 speed. As shown in FIG. 3, the driving force from at least one of engine Eng and motor/generator MG is inputted from a transmission input shaft Input and a shift gear mechanism having four planetary gears and seven frictional engagement elements performs a gear shift for a revolution speed and the shifted revolution speed is outputted from a transmission output shaft Output.

As the shift gear mechanism, a first planetary gear set GS1 including a first planetary gear G1 and a second planetary gear G2 and a second planetary gear set GS2 including a third planetary gear G3 and a fourth planetary gear G4 are arranged coaxially in this sequence. As hydraulic pressure operated frictional engagement elements, first clutch C1, second clutch C2, third clutch C3, a first brake B1, a second brake B2, a third brake B3, and a fourth brake B4 are arranged. In addition, as mechanically operated engagement elements, a first one-way clutch F1 and a second one-way clutch F2 are arranged.

Each of first planetary gear G1, second planetary gear G2, third planetary gear G3, and fourth planetary gear G4 is a single pinion type planetary gear having a sun gear (S1~S4), a ring gear (R1~R4), and carriers (PC1~PC4) supporting pinions (P1~P4) meshed with both gears (S1~S4) and (R1~R4).

Transmission input shaft Input is linked to second ring gear R2 to input a revolution driving force from at least one of engine Eng and motor/generator MG. Transmission output shaft Output is linked to third carrier PC3 and transmits the output revolution driving force to drive wheels (left and right rear road wheels RL, RR) via a final gear and so forth.

First ring gear R1, second carrier PC2, and fourth ring gear R4 are integrally linked by means of a first linkage member M1. Third ring gear R3 and fourth carrier PC4 are integrally linked by means of a second linkage member M2. First sun gear S1 and second sun gear S2 are integrally linked by means of a third linkage member M3.

FIG. 4 shows an engagement operation table. In FIG. 4, an O mark indicates that the corresponding frictional engagement element is hydraulic pressure engaged in a drive state, an (O) mark indicates that the corresponding frictional engagement element is hydraulic pressure engaged in a coast state (in the drive state, a one way clutch is operated), and no mark indicates that the corresponding frictional engagement element is in the released state.

By performing such a replacement gear shift that, from among the respective frictional engagement elements, one frictional engagement element that has been engaged is released and another frictional engagement element that has been released is engaged, the gear shift stage of the forward 7 speed and reverse 1 speed can be realized as shown in FIG. 4. Furthermore, when, during a stop of the vehicle, an N→D selecting operation in which the range is switched from the neutral range (the N range) to a drive range (the D range) which is a traveling range, a backlash elimination control of second brake B2 (the frictional engagement element engaged in the traveling range) is carried out. It should be noted that the backlash elimination control is a control in which an initial hydraulic pressure is applied to eliminate a gap (backlash) of a brake plate of second brake B2. This backlash elimination control is carried out to secure a start response characteristic of the vehicle, with an immediate hydraulic pressure engaged state of second brake B2, during a start by an accelerator depression operation. It should be noted that, during the vehicular start from N→D selecting operation, a "first speed stage" is obtained by the engagement of second brake B2 and the engagements of one way clutch F1 and second one way clutch F2. Then, second brake B2 serves as second clutch CL2.

FIG. 5 shows a shift map. When the driving point on the map specified by vehicle speed VSP and accelerator opening angle APO transverse an up-shift line, an up-shift command is outputted. For example, when the gear shift stage is 1st speed stage and the driving point (VSP, APO) traverses a 1→2 up-shift line, a 1→2 up-shift command is outputted. It should be noted that FIG. 5 describes only up-shift lines but, of course, down-shift lines are set with hysteresis for each of the individual up-shift lines.

[Detailed Structure of N→D Selecting Control Process]

Figure 6:
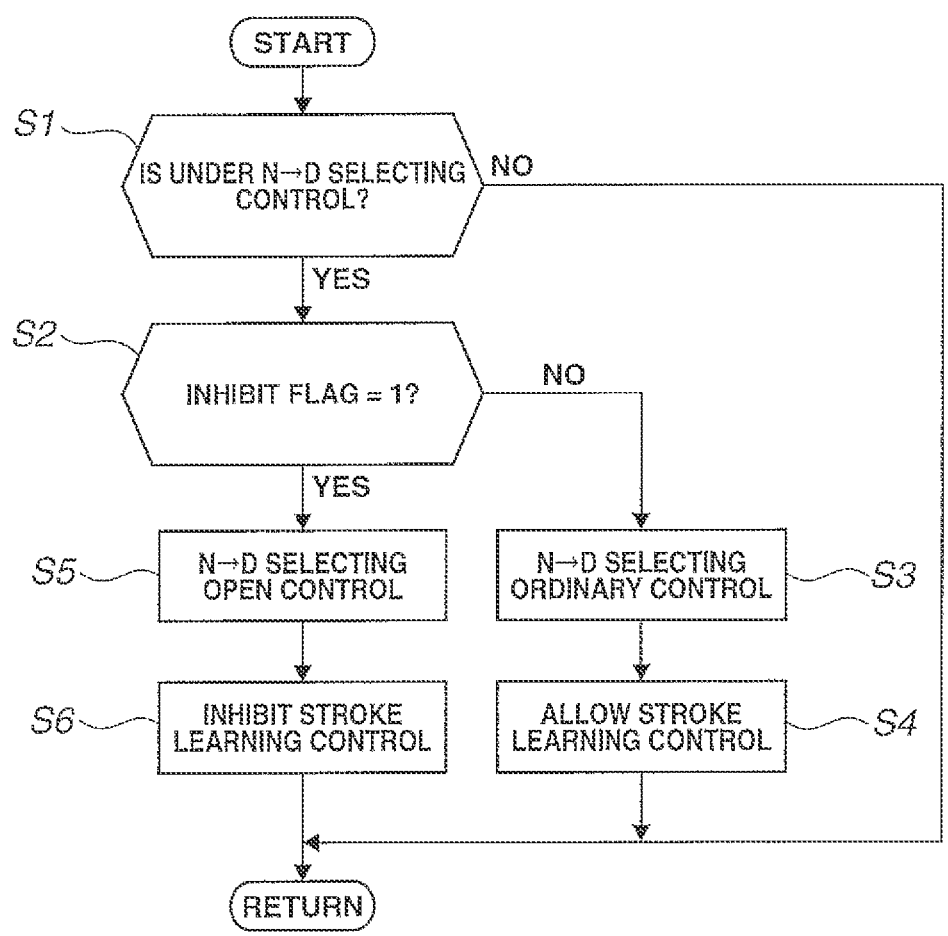
FIG. 6 is a flowchart representing a flow of an N D selecting control process executed in the AT controller in the first preferred embodiment.

FIG. 6 shows a flowchart representing a flow of the N→D selecting control process executed in AT controller 7 in the first preferred embodiment. Each step in FIG. 6 representing the detailed structure of the N→D selecting so control process will, hereinafter, be explained.

At a step S1, AT controller 7 determines whether a signal from inhibitor switch 18 indicates that the range is switched from the N range to the D range, namely, the N→D selecting control is being carried out. If YES (the N→D selecting control is being carried out), the routine goes to a step S2. If NO (other than N→D selecting control), the routine goes to a return.

At step S2, AT controller 7 determines whether inhibit flag=1 after the determination at step S1 that the N→D selecting control is being carried out. If YES (inhibit flag=1), the routine goes to a step S5. If NO (inhibit flag=0), the routine goes to a step S3.

It should be noted that the "inhibit flag" is a flag which inhibits an engagement start determination determining that a piston stroke is completed and an engagement of second brake B2 is started when such a condition that MG torque variation quantity>threshold value is established during the N→D selection in the HEV mode. That is to say, the stroke completion determination (engagement start determining means) carried out by the condition establishment such that MG torque variation quantity>threshold value is the engagement start determination of second brake B2 which starts the transmission of the driving torque via second brake B2.

At step S3, AT controller 7 carries out an N→D selecting ordinary control after the determination at step S2 that inhibit flag=0 and the routine goes to a step S4. It should be noted that the "N→D selecting ordinary control" is a backlash elimination control of second brake B2 by means of a commanded hydraulic pressure which is rewritten and stored through a learning control during the N→D selection.

At step S4, subsequent to the N→D selecting ordinary control at step S3, a stroke learning control in which the commanded hydraulic pressure of second brake B2 is learned is allowed and the routine goes to the return.

It should, herein, be noted that the "stroke learning control" is a control in which the commanded hydraulic pressure of second brake B2 is learned so that a backlash elimination control time from the start of the N→D selection to the stroke completion gives a target time. That is to say, a required time from the N→D selection start to the piston stroke completion is measured and the commanded hydraulic pressure is increased by a predetermined learning quantity in a case where the required time exceeds the target time. On the contrary, in a case where the required time is shorter than the target time, the commanded hydraulic pressure is decreased by the predetermined learning quantity. The learning control is a control in which the required time from the N→D selection start to the piston stroke completion is converged into the target time by experiencing many times such a learning correction as described above, regardless of dispersions, an aging deterioration, and so forth.

It should further be noted that the "allowance of the stroke learning control" is as follows: The determination of the piston stroke completion (=engagement start) when such a condition that MG torque variation quantity>threshold value is established during N→D selection in the HEV mode is made and the required time from the N→D selection start to the piston stroke completion is measured. Then, the learning control is allowed which corrects the commanded hydraulic pressure during the backlash elimination control dependent upon whether the required time is longer or shorter than the target time.

At step S5, after the determination at step S2 that the inhibit flag=1, the N→D selecting OPEN control is carried out and the routine goes to a step S6 (inhibit time hydraulic pressure setting means). It should, herein, be noted that the "N→D selecting OPEN control" is a control (OPEN control) (determination inhibit means) in which, in a case where the inhibit flag which inhibits the engagement start determination=1, the commanded hydraulic pressure by which the backlash elimination for second brake B2 (=CL2) is carried out is a commanded hydraulic pressure higher than an ordinary commanded hydraulic pressure (a learning hydraulic pressure) which is not inhibited during a predetermined interval of time by means of a backlash elimination timer.

At step S6, after the N→D selecting OPEN control at step S5, the stroke learning control in which the commanded hydraulic pressure during the backlash elimination control for second brake B2 is learned is inhibited and the routine goes to the return.

It should, herein, be noted that the "inhibit of the engagement start determination" is the inhibit for the determination of the piston stroke completion (=engagement start) when the condition such that MG torque variation quantity>threshold value is established during the N→D selection in the HEV mode and the stroke learning control is not carried out. It should be noted that, when the stroke learning control is inhibited, the completion of the backlash elimination control is determined from a lapse of time of the backlash elimination timer.

[Detailed Structure of Inhibit Lag Setting Process]

Figure 7:
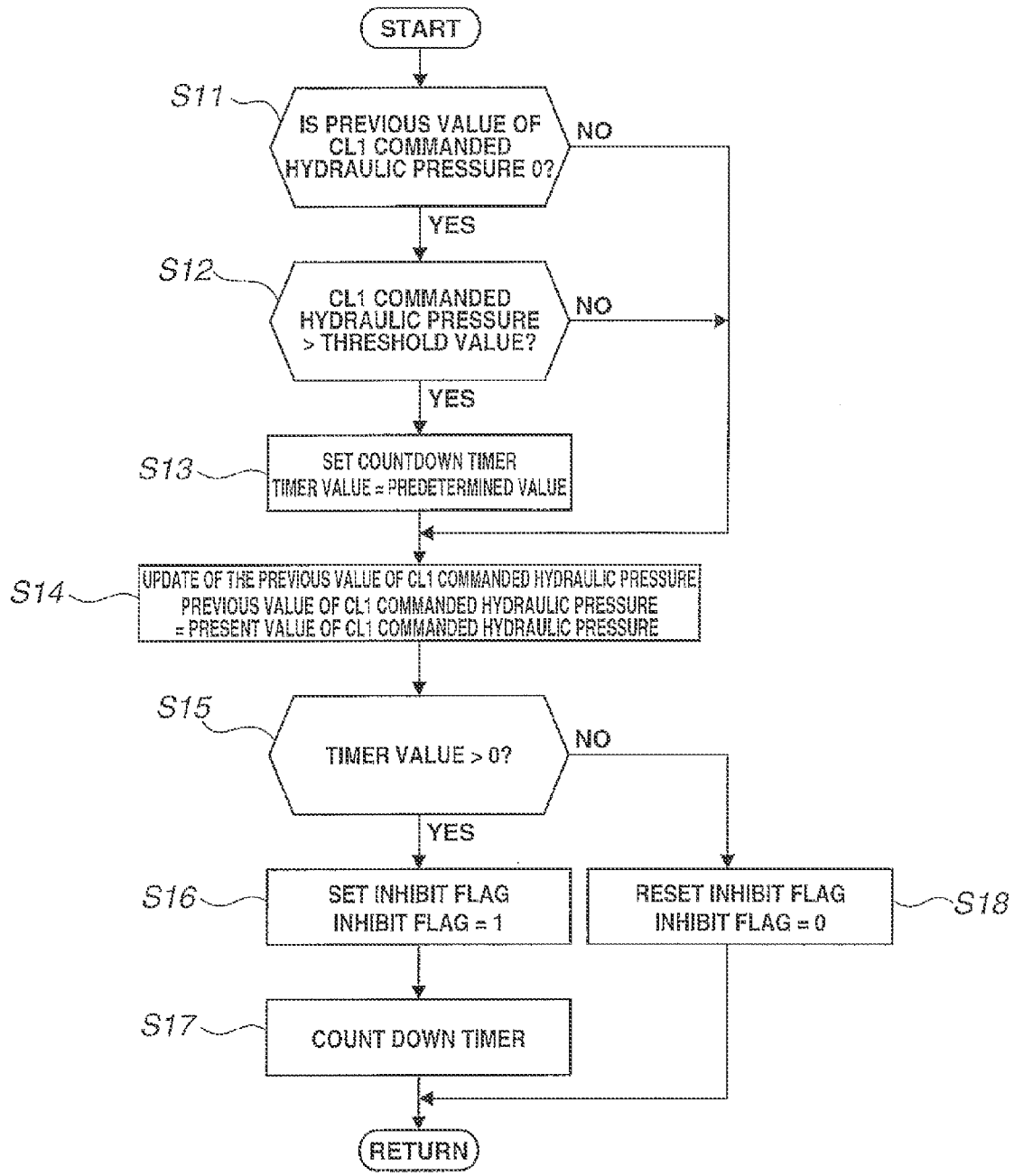
FIG. 7 is a flowchart representing a flow of an inhibit flag setting process executed in the AT controller in the first preferred embodiment.

FIG. 7 shows a flowchart representing a flow of inhibit flag setting process executed in AT controller 7 in the first preferred embodiment. Each step in FIG. 7 representing the detailed structure of the inhibit flag setting process will be explained.

At a step S11, AT controller 7 determines whether a previous value of a CL1 commanded hydraulic pressure for first clutch CL1 is 0 (previous value of CL1 commanded hydraulic pressure=0). If YES (previous value of CL1 commanded hydraulic pressure=0), the routine goes to a step S12. If NO (previous value of CL1 commanded hydraulic pressure≠0), the routine goes to a step S14.

At step S12, AT controller 7 determines whether the CL1 commanded hydraulic pressure is in excess of a threshold value after the determination at step S11 that the CL1 commanded hydraulic pressure previous value=0. If YES (CL1 commanded hydraulic pressure>threshold value), the routine goes to a step S13. If NO (CL1 commanded hydraulic pressure≤threshold value), the routine goes to step S14. It should be noted that the "threshold value" is set to a commanded hydraulic pressure value which provides a hydraulic pressure equivalent to the release of first clutch CL1 of the normal close type.

At step S13, AT controller 7 sets a count down timer to a predetermined value after the determination at step S12 that the CL1 commanded hydraulic pressure>threshold value and the routine goes to step S14.

It should be noted that the predetermined value is set on a basis of a time required for a determination that engine Eng is not in a complete explosion from among the engine stop control carried out along with a mode switching from the HEV mode to the EV mode.

At step S14, AT controller 7 updates the previous value of the CL1 commanded hydraulic pressure after the determination at step S11 that the CL1 commanded hydraulic pressure≠0, after the determination at step S12 that the CL1 commanded hydraulic pressure≤threshold value, or after the determination at step S13 that the count down timer is set and the routine goes to a step S15. It should be noted that the CL1 commanded hydraulic pressure previous value is updated in the following way.

The previous value of the CL1 commanded hydraulic pressure=the present value of the CL1 commanded hydraulic pressure.

At step S15, AT controller 7 determines whether the timer value set at step S13 is timer value>0, after the update of the previous value of the CL1 commanded hydraulic pressure at step S14.

If YES (timer value≥0), the routine goes to a step S16.

If NO (timer value=0), the routine goes to a step S18.

At step S16, AT controller 7 sets an inhibit flag representing the inhibit of the engagement start determination to 1, after the determination at step S15 that the timer value>0 and the routine goes to a step S17. It should be noted that the "inhibit flag" is the flag used at step S2 in FIG. 6 which inhibits the engagement start determination determining that the piston stroke is completed and the engagement of second brake B2 is started when the condition such that the MG torque variation quantity>threshold value is established during the N→D selection in the HEV mode.

At step S17, the AT controller 7 counts down the timer whose timer value is decreased for each of process periods, after the inhibit flag set at step S16, and the routine goes to the return.

At step S18, AT controller 7 resets the inhibit flag representing the inhibit of the engagement start determination (inhibit flag=0) after the determination at step S15 that the timer value=0 and the routine goes to the return.

Next, an action will be explained.

The action of the control apparatus for automatic transmission AT in the first prefer red embodiment will be explained dividing the explanation into [N→D selecting control process action], [Inhibit flag setting process action], and [Mode transition intervention action during the N→D selecting control.

[N→D Selecting Control Process Action]

During an N→D selecting control which engages second brake B2, the switching control from the HEV mode to the EV mode is intervened so that the respective controls are mutually overlapped and executed. At this time, it is necessary to inhibit the engagement start determination under a constant condition since the engagement start determination is erroneously determined. Hereinafter, the N→D selecting control process action which reflects on this matter will be explained.

When N→D selecting control is being carried out and the inhibit flag is 0, a flow of advancing from step S1→step S2→step S3→step S4→return shown in FIG. 6 is repeated. At step S3, the N→D selecting ordinary control is carried out in which the backlash elimination control for second brake B2 is carried out according to the commanded hydraulic pressure rewritten and stored by means of the learning control during the N→D selection. At step S4, the stroke learning control to learn the commanded hydraulic pressure of second brake B2 is allowed.

Hence, when the N→D selecting control in the HEV mode is being carried out and the inhibit flag=0, the piston stroke completion is determined when such a condition that the MG torque variation quantity>threshold value is established and the required time (backlash elimination control time) from the N→D selection is started to the piston stroke completion is measured. Then, the commanded hydraulic pressure during the backlash elimination control is learning corrected dependent upon whether the required time is longer or shorter than the target time.

On the other hand, when the N→D selecting control is being carried out and the inhibit flag is "1", in the flowchart of FIG. 6, the flow of step S1→step S2→step S5→step S6→return is repeated. At step S5, the N→D selecting OPEN control is carried out in which the commanded hydraulic pressure which carries out the backlash elimination for second brake B2 (=CL2) is higher than the ordinary commanded hydraulic pressure (the learning hydraulic pressure). At step S6, the stroke learning control in which the commanded hydraulic pressure during the backlash elimination control of second brake B2 is learned is inhibited.

Hence, when the N→D selecting control is being carried out and the inhibit flag=1, the determination that the piston stroke is completed, when the condition such that the MG torque variation quantity>threshold value is established during the N→D selection in the HEV mode, is inhibited.

As described above, in the first preferred embodiment, in a case where a switching from the HEV mode to the EV mode occurs and before the determination that second brake B2 starts the engagement, the determination of the engagement start according to the condition establishment such that the MG torque variation quantity>threshold value is inhibited.

That is to say, motor/generator MG is revolution number controlled so that an input revolution number of automatic transmission AT becomes constant during the HEV mode (WSC mode) at the time of the vehicular stop. When, at this time, the engagement of second brake B2 is started, a load applied to motor/generator MG is increased. However, a torque of motor/generator MG is increased so that the revolution number control is maintained in order to maintain the input revolution number constant irrespective of the increase of this load. Hence, when the load of motor/generator MG is increased by a predetermined quantity and such a condition that the variation quantity of the MG torque>threshold value is established, the determination that the piston stroke is completed and second brake B2 starts the engagement can be determined.

However, when the switching from the HEV mode to the EV mode occurs, the engine stop process and the separation process between engine Eng and motor/generator MG are carried out. Thus, the load of motor/generator MG is varied irrespective of the start of the engagement of second brake B2. Hence, when the backlash elimination control for second brake B2 is carried out in response to the N→D selecting start, the switching from the HEV mode to the EV mode is intervened. In this case, a load variation of motor/generator MG which occurs due to the engine stop process and so forth is erroneously determined to be a load variation due to the engagement start of second brake B2.

Therefore, when the mode switching from the HEV mode to the EV mode occurs during the N→D selecting control and the inhibit flag is set to "1", the engagement start determination for second brake B2 due to the load variation of motor/generator MG is not carried out. Consequently, the load variation of motor/generator MG which is generated along with the mode switching from the HEV mode to the EV mode can be prevented from the erroneous determination of the engagement start of second brake B2.

In the first preferred embodiment, when the inhibit flag=1 during the N→D selecting control, the routine goes to step S5. At step S5, the N→D selecting OPEN control such that the commanded hydraulic pressure of second brake B2 is higher than the hydraulic pressure which is not inhibited during the predetermined interval of time by means of the backlash elimination timer is adopted.

According to this structure described above, in a case where the engagement start determination for second brake B2 is inhibited (inhibit flag=1), the backlash elimination control for second brake B2 is completed at a time shorter than the target time in the N→D selecting ordinary control.

Hence, even in a case where the engagement start of second brake B2 cannot be determined from the load variation quantity of motor/generator MG, a state in which the engagement of second brake B2 is started (a state in which the backlash elimination of second brake B2 is completed) can be guaranteed.

[Inhibit Flag Setting Process Action]

As described above, when the switching from the HEV mode to the EV mode occurs, the inhibit flag is set to "1" due to a specific condition representing that the mode switching occurs. Hereinafter, the inhibit flag setting process action of the first embodiment using the condition of the release of first clutch CL1 as the specific condition representing the mode switching will be explained.

When the condition that the CL1 commanded hydraulic pressure previous value=0 and the CL1 commanded hydraulic pressure (present value) threshold value is established on a basis of a transition command from the HEV mode to the EV mode, in the flowchart of FIG. 7, the routine advances as step S11→step S12→step S13→step S14→step S15→step S16→step S17→return. At step S13, the count down timer is set to the predetermined value. At step S16, after the determination at step S15 that the timer value>0, the inhibit flag representing the inhibit of the engagement start determination is set to "1".

Then, until the timer value becomes 0 from the subsequent control period, in the flowchart in FIG. 7, the flow of step S11→step S14→step S15→step S16→step S17→return is repeated so that the inhibit flag=1 is maintained. Furthermore, when the timer value=0, in the flowchart in FIG. 7, the flow of step S11→step S14→step S15→step S18→return is repeated. At step S18, inhibit flag is reset to "0" (inhibit flag=0).

In the first preferred embodiment, the structure such that, in a case where first clutch CL1 starts the release before the determination that second brake B2 has started the engagement, the inhibit flag inhibiting the engagement start determination is set to "1" (inhibit flag=1) is adopted.

That is to say, when the switching from the HEV mode to the EV mode is carried out, the clutch release control in which first clutch CL1 interposed between engine Eng and motor/generator MG is released is started. Therefore, by inhibiting the engagement start determination when first clutch CL1 starts the release, the variation of the load of motor/generator MG which is generated when the switching from the HEV mode to the EV mode can be prevented from being erroneously deter mined as the engagement start.

[Mode Transition Intervention Action During the N→D Selecting Control]

Figure 8:
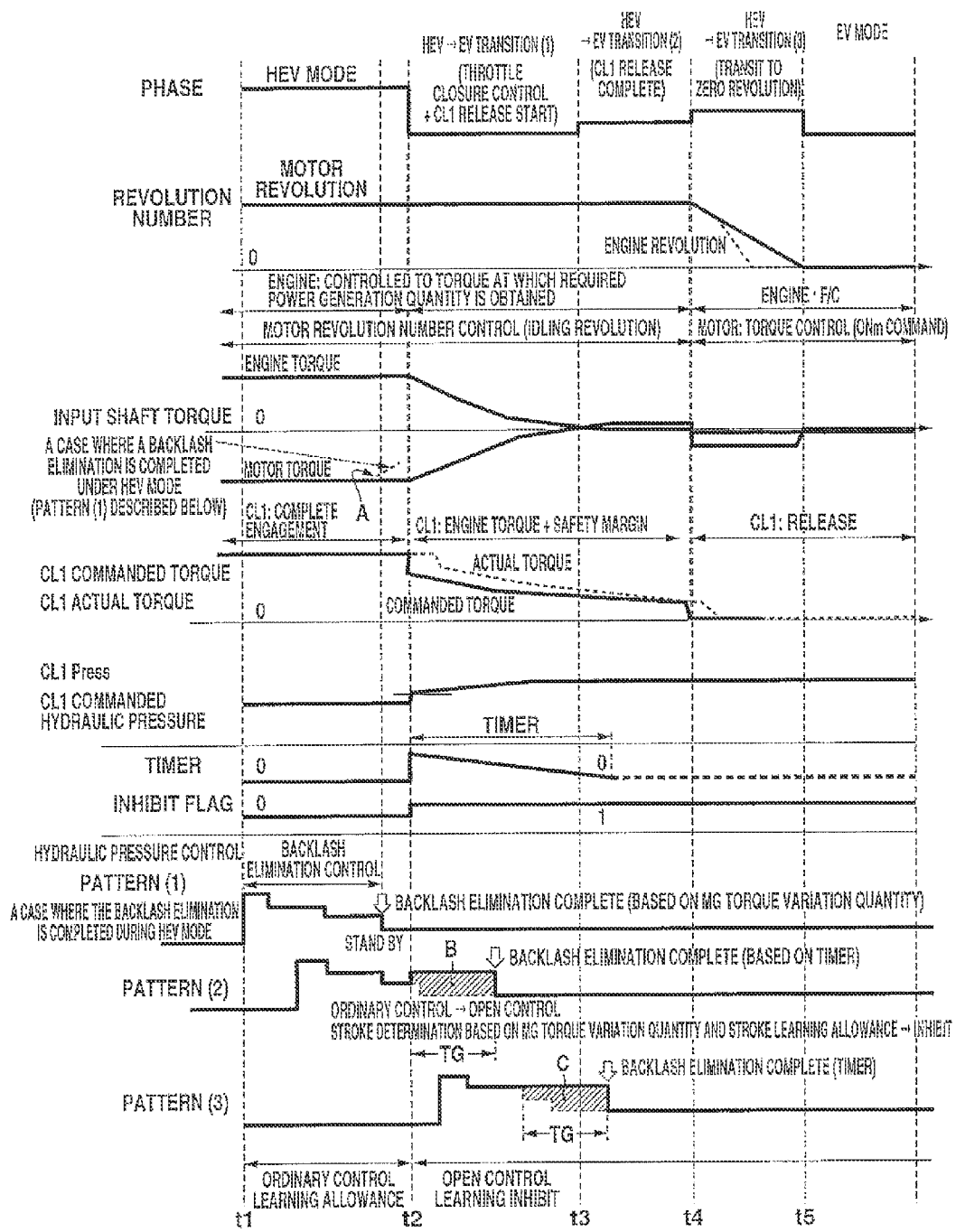
FIG. 8 is a timing chart representing each characteristic of a phase, a revolution number, an input shaft torque, an CL1 command torque, an CL1 actual torque, an CL1 commanded hydraulic pressure, a timer, an inhibit flag, and a frictional engagement element in a case where a switching from an HEV mode to an EV mode is intervened under an N→D selecting control when the hybrid vehicle in which the control apparatus in the first embodiment is mounted is stopped.

FIG. 8 shows a timing chart representing each characteristic in a case where the switching from the HEV mode to the EV mode is intervened during the N→D selecting control in a case where the hybrid vehicle in which the control apparatus in the first preferred embodiment is mounted is stopped. Hereinafter, the mode transition intervention action during the N→D selecting control.

In the timing chart of FIG. 8, t1 denotes a time at which N→D selecting control in a pattern (1) in the HEV mode is started. t2 denotes a time at which an engine stop and CL1 release are started based on a mode transition command from HEV mode to EV mode.

t3 denotes a time at which zero transition of the engine torque and the motor torque is completed, t4 denotes a time at which a revolution zero transition of the engine revolution number and the motor revolution number is started, t5 denotes a time at which a revolution zero transition is completed and at which the EV mode is started.

Time t1~time t2 is an engine power generation phase in the HEV mode. For example, when such a condition of a charge completion to battery 4 is established at time t2, a phase transition signal from the HEV mode to the EV mode is outputted. In this phase, with an idling revolution number of engine Eng as a target revolution number, motor/generator MG is revolution number controlled so as to maintain the idling revolution number. The engine torque is controlled to the torque at which a required power generation is obtained and the motor torque is controlled to a negative torque (a regeneration torque) at which the engine torque is converted into a power generation energy. A CL1 command torque and a CL1 actual torque are the torque maintaining the engagement of first clutch CL1. The CL1 commanded hydraulic pressure is maintained at zero pressure. Since first clutch CL1 is in the engagement state, the timer value and inhibit flag are set to 0. The engine power generation phase in the HEV mode at time t1~time t2 is an interval of time of the ordinary control and the learning allowance.

Time t2~time t3 is a phase of HEV EV transition (1) phase. At time t2, the engine stop process and the first clutch release process are started. If, at time t3, the zero transition of the engine torque and the motor torque is completed, the phase is transited to the subsequent phase. In this phase, subsequent to time t1~time t2, with the idling revolution number of engine Eng as the target revolution number, the revolution number control of motor/generator MG is maintained to maintain the idling revolution number. The engine torque is controlled in such a way that the torque is gradually reduced due to a throttle closure control and the motor torque is controlled in such a way that the torque is gradually raised in synchronization with the engine torque. The CL1 commanded torque and the CL1 actual torque are controlled in such a way that a response of the CL1 actual torque is delayed with respect to the CL1 commanded torque but are controlled to be reduced in a direction that first clutch CL1 is gradually released. The CL1 commanded hydraulic pressure is raised in a stepwise manner at time t2 and, thereafter, is gradually raised toward time t3. The timer is set to the predetermined value when the timer exceeds a threshold value due to a rise in the CL1 commanded hydraulic pressure and gradually reduced toward time t3. The inhibit flag is set to "1" (inhibit flag=1) since the timer value>0. The HEV→EV transition (1) phase of time t2~time t3 provides an interval of time of the OPEN control and learning inhibit.

Time t3~time t4 is an HEV EV transition (2) phase. When the zero transition of the engine torque and the motor torque is completed at time t3, a continuation of the first clutch release process causes the release completion of first clutch CL1 at time t4 and the phase is transited to the subsequent phase. In this phase, subsequent to time t1~time t3, with the idling revolution number of engine Eng as the target revolution number, the revolution number control for motor/generator MG is maintained to maintain the idling revolution number. Zero torque is maintained for the engine torque and the motor torque is controlled to the torque corresponding to the engine load. The CL1 commanded torque and the CL1 actual torque are controlled so that the CL1 commanded torque indicates zero at time t4 although the response of the CL1 actual torque is delayed with respect to the CL1 commanded torque. The CL1 commanded hydraulic pressure maintains the hydraulic pressure at time t3. The timer gives zero at a timing a slightly exceeding time t3. The inhibit flag based on the timer is reset at a timing at which this timer indicates zero. However, in the first preferred embodiment, when such a control (not shown) that detecting the flag information that the engine is not completely exploded (a flag indicating that the engine is under the complete explosion is extinguished) at time t3 is carried out, the inhibit flag=1 and, after time t3, the inhibit flag is maintained at "1".

Time t4~time t5 is an HEV EV transition (3) phase. When the release of first clutch CL1 is completed at time t4, the control of reducing the engine revolution and the motor revolution is carried out. Then, at time t4, the transition of zero revolution is completed and the phase is transited to the subsequent phase.

In this phase, control is transited from the revolution number control of motor/generator MG from time t1~time t4 to the torque control (ONm command) of motor/generator MG and, at time t5, the motor revolution number is zeroed. The engine revolution number is zeroed at an earlier timing than time t5 due to a fuel cut-off control of engine Eng. The engine torque provides a negative torque due to the fuel cut-off control and the motor torque maintains the zero torque which is a torque control target. The CL1 commanded torque and the CL1 actual torque are maintained at zero which represents the so released state of first clutch CL1. The CL1 commanded hydraulic pressure maintains the hydraulic pressure at time t4. The inhibit flag remains "1" on a basis of the information that engine Eng is not in the complete explosion state. Then, after time t5, the vehicle prepares for a start of the vehicle in response to an accelerator operation in the EV mode. In the EV mode after time t5, since the vehicle is stopped. Thus, the revolution number is zero and the stroke determination based on the MG torque variation quantity cannot be made (the revolution is not varied even if the clutch engagement is carried out). Hence, the stroke determination is set to "inhibit".

In the N→D selecting control, after the transition to the EV mode, in order to prepare for the vehicular start of the accelerator depression operation and in order to increase a start response characteristic by engaging second brake B2 without delay in a hydraulic pressure response, the backlash elimination control for second brake B2 is carried out. In this case, since the timings of the backlash elimination start and the backlash elimination end are different, the following three patterns (pattern (1), pattern (2), and pattern (3)) are provided, as shown in the characteristics of the hydraulic pressure control at a lower part of FIG. 8.

Pattern (1)

In pattern (1) in which the timings of the backlash elimination start and the backlash elimination end are before OPEN control (learning inhibit), the backlash elimination control is started at time t1 and the backlash elimination control is ended (completed) at a time before time t2, namely, the backlash elimination control is completed during the HEV mode. Therefore, the N→D selecting ordinary control and the stroke learning control are allowed and the backlash elimination completion (engagement start determination) is confirmed by an establishment of a condition of MG torque variation quantity>threshold value as shown by an arrow mark A in FIG. 8.

Pattern (2)

In pattern (2) in which the backlash elimination start timing is before the OPEN control (learning inhibit) but the backlash elimination completion timing is after the OPEN control (learning inhibit), the backlash elimination control is started at a time before time t2 and the backlash elimination control is completed at a time after time t2, namely, the mode switching control and the backlash elimination control are partially overlapped. Therefore, if the backlash elimination completion determination (engagement start determination) is carried out by the establishment of the condition such that MG torque variation quantity>threshold value, there is a possibility of the erroneous determination. Hence, at time t2, control is changed from the N→D selecting ordinary control to the N→D selecting OPEN control and the stroke learning control is inhibited. Thus, the erroneous determination of the engagement start determination can be prevented. It should be noted that the determination of the backlash elimination completion is carried out by a passage of time of a backlash elimination timer time TG and a hatched region denoted by B in FIG. 8 is a part which is higher pressure than the commanded hydraulic pressure in the ordinary control.

Pattern (3)

In pattern (3) in which the backlash elimination start timing is after the OPEN control (learning inhibit), the backlash elimination (control) is started at a time after time t2 and the backlash elimination (control) is completed at a time after time t3, namely, the mode switching control and the backlash elimination control are mutually overlapped. Therefore, if the backlash elimination completion determination (engagement start determination) is carried out by an establishment of the condition such that MG torque variation quantity>threshold value, there is a possibility of the erroneous determination. Thus, at time t2, control is changed from the N→D selecting ordinary control to the N→D selecting OPEN control and the stroke learning control is inhibited. Consequently, the erroneous determination of the engagement start determination can be prevented. It should be noted that the determination of the backlash elimination completion is carried out by the time passage of the backlash elimination timer TG and the hatched region shown in C of FIG. 8 is a part which is higher than the commanded hydraulic pressure in the ordinary control.

Next, an effect of the control apparatus in the first embodiment will be explained. The control apparatus for automatic transmission AT in the first preferred embodiment has the following effects.

(1) The control apparatus for automatic transmission AT into which the driving forces from the driving sources including engine Eng and motor (motor/generator MG) are inputted, comprises: the frictional engagement element (second brake B2) engaged in the traveling range (D range); engagement start determining means (steps S2→S3→S4 in FIG. 6) for determining that the frictional engagement element (second brake B2) has started the engagement in a case where the load of the motor (motor/generator MG) is increased by the predetermined quantity during the revolution number control in which the revolution number of input shaft IN of automatic transmission AT is controlled to the predetermined target revolution number and when the traveling range is selected (N→D selecting) to engage the frictional engagement element (second brake B2) in the released state; and determination inhibit means (step S2→S5→S6 in FIG. 6) for inhibiting the determination by the engagement start determining means before the determination that the frictional engagement element (second brake B2) has started the engagement and in a case where the switching from the HEV mode in which the driving forces of engine Eng and the motor (motor/generator MG) are inputted to input shaft IN to the EV mode in which the driving force of only the motor (motor/generator) is inputted to input shaft IN occurs.

Hence, the load variation of the motor (motor/generator MG) which is developed due to the switching from the HEV mode to the EV mode can be prevented from the erroneous determination of the engagement start of the frictional engagement element (second brake B2).

(2) The control apparatus for automatic transmission AT further comprises: inhibit time hydraulic pressure setting means (step S5 of FIG. 6) for setting the commanded hydraulic pressure to the frictional engagement element (second brake B2) higher than the case of not inhibited during the predetermined interval of time (backlash elimination timer time TG) in a case where the determination is inhibited by the determination inhibiting means (steps S2→S5→S6 in FIG. 6).

Therefore, in addition to the effect described in (1), even in a case where the engagement start of frictional engagement element (second brake B2) cannot be determined from the load variation quantity of motor/generator MG, the state in which the backlash elimination of the frictional engagement element (second brake B2) has completed can be guaranteed.

(3) in the control apparatus for automatic transmission AT, the determination inhibit means (step S2 in FIG. 6, FIG. 7) inhibits the determination by the engagement start determining means (step S16 in FIG. 7) before the determination that the engagement of the frictional engagement element (second brake B2) has started and in a case where the engagement element (first clutch CL1) interposed between engine Eng and the motor (motor/generator MG) starts the release.

Therefore, in addition to the effects of (1) and (2), the engagement start determination is inhibited when the engagement element (first clutch CL1) starts the release. Thus, the variation of the load of motor/generator MG which is developed due to the switching of the mode from the HEV mode to the EV mode can be prevented from the erroneous determination of the engagement start.

That is to say, when the mode is switched from the HEV mode to the EV mode, the release control of the engagement element (first clutch CL1) interposed between engine Eng and motor (motor/generator MG) is started. With this point in mind, the engagement start determination according to the MG torque variation quantity is inhibited.

Second Embodiment

In a second preferred embodiment, the engagement start determination according to the MG torque variation quantity is inhibited in a case where a phase transition signal from the HEV mode to the EV mode is detected.

First, the structure will be explained.

[Detailed Structure of the Inhibit Flag Setting Process]

Figure 9:
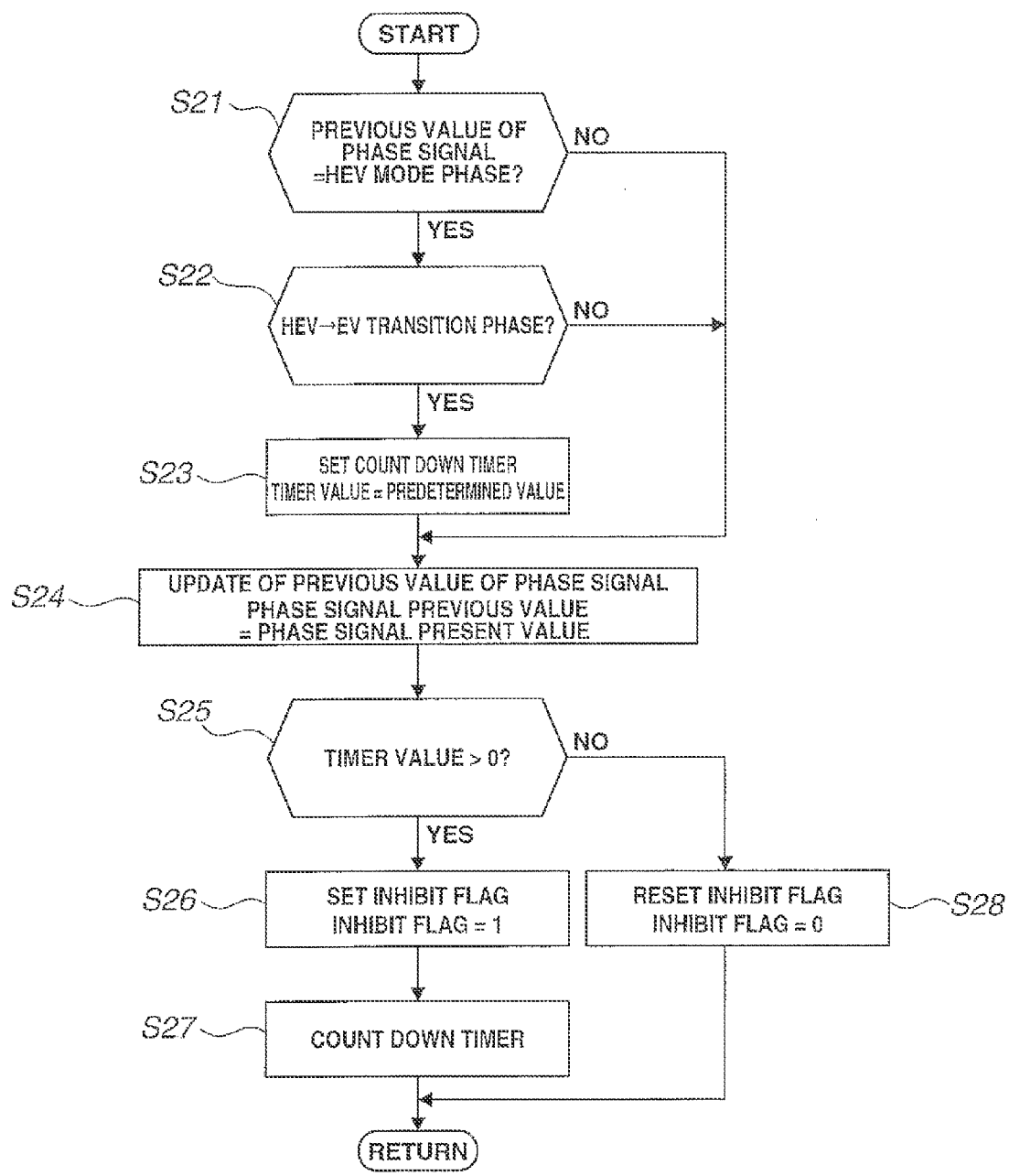
FIG. 9 is a flowchart representing a flow of an inhibit flag setting process executed in the AT controller in a second preferred embodiment.

FIG. 9 shows a flowchart representing the flow of the inhibit flag setting process executed in AT controller 7 in the second preferred embodiment.

Each step in FIG. 9 representing the detailed structure of the inhibit flag setting process will be explained. It should be noted that, since each step of step S23 and steps S25~step S28 corresponds to each step of step S13 and steps S15~step S18 in FIG. 7, the explanation thereof will, herein, be omitted.

At a step S21, AT controller 7 determines whether the previous value of the phase signal is the HEV mode phase. If YES (the previous value of the phase signal=HEV mode phase), the routine goes to a step S22. If NO (the previous value of the phase signal≠HEV mode phase), the routine goes to a step S24.

At step S22, AT controller 7 determines whether the phase signal indicates HEV→EV transition phase subsequent to the determination at step S21 that the previous value of the phase signal=HEV mode phase. If YES (HEV→EV transition phase), the routine goes to a step S23. If NO (not HEV→EV transition phase), the routine goes to step S24.

At step S24, subsequent to the determination at step S21 that the previous value of the phase signal≠HEV mode phase, the subsequent determination at step S22 that not in the HEV mode→EV mode transition phase, or subsequent to the set to the count down timer at step S23, the AT controller 7 updates the previous value of the phase signal and the routine goes to a step S25. It should be noted that the previous value of the phase signal is updated as the previous value of the phase signal=phase signal present value.

It should be noted that the other structure in the second preferred embodiment is the same as FIGS. 1 through 6 in the first preferred embodiment, the explanation thereof and drawing indication thereof will herein be omitted.

Next, an action of the second preferred embodiment will be explained.

[Inhibit Flag Setting Process Action]

As described above, when the mode switching from the HEV mode to the EV mode occurs, the inhibit flag is set to "1" depending upon a specific condition indicating that the mode is being switched. Hereinafter, as the specific condition that the mode is being switched, the inhibit flag setting process action in the second preferred embodiment using the detection condition of phase transition signal of the HEV mode to the EV mode will be explained.

If such conditions that the previous value of the phase signal=HEV mode phase and that HEV EV transition phase are established, in the flowchart in FIG. 9, the routine advances as follows: step S21→step S22→step S23→step S24→step S25→step S26→step S27→return. At step S23, the count down timer is set as timer value=predetermined value. At step S26, subsequent to the determination at step S25 that the timer value>0, the inhibit flag is set to "1" representing the inhibit of the engagement start determination.

Then, during the time interval from the time at which the subsequent control period is started to the time at which the timer value becomes zero, in the flowchart of FIG. 9, the flow of step S21→step S24→step S25→step S26→step S27→return is repeated and the inhibit flag=1 is maintained. Furthermore, when the timer value=0, in the flowchart of FIG. 9, the flow of step S21→step S24→step S25→step S28→return is repeated. At step S28, subsequent to the determination at step S25 that timer value=0, the inhibit flag is reset to 0 (inhibit flag=0).

In the second embodiment, before the determination that the engagement of second brake B2 has started and in a case where the phase transition signal from the HEV mode to the EV mode is detected, the inhibit flag representing the inhibit of the engagement start determination is set to "1".

That is to say, the mode switching from the HEV mode to the EV mode occurs on a basis of the phase transition signal from the HEV mode to the EV mode. Thus, when the phase transition signal from the HEV mode to the EV mode is detected, the engagement start determination is inhibited. Consequently, the variation of the load of motor/generator which is developed due to the switching of the mode from the HEV mode to the EV mode can be prevented from the erroneous determination of the engagement start.

It should be noted that the other action of the second embodiment is the same as the first embodiment and, thus, the explanation thereof will herein be omitted.

Next, the effect will be explained.

In the control apparatus for automatic transmission AT in the second preferred embodiment can obtain the following effect.

(4) The above-described determination inhibit means (step S2 in FIG. 6, FIG. 9) inhibits the determination by the engagement start determining means (step S26 in FIG. 9) before the determination that the engagement of the frictional engagement element (second brake B2) is started and in a case where the phase transition signal from the HEV mode to the EV mode is detected.

Therefore, in addition to the effects of (1) or (2) in the first preferred embodiment, when the phase transition signal from the HEV mode to the EV mode is detected, the engagement start determination is inhibited. Thus, the variation of the load of motor/generator MG which is developed due to the mode switching from the HEV mode to the EV mode can be prevented from the erroneous determination of the engagement start. That is to say, on a basis of the phase transition signal from the HEV mode to the EV mode, the switching from the HEV mode to the EV mode occurs. With this point noted, the engagement start determination according to the MG torque variation quantity is inhibited.

Third Embodiment

In a third preferred embodiment, the engagement start determination according to the MG torque variation quantity is inhibited in a case where the engine stop process is detected to be started.

First, the structure in the third preferred embodiment will be explained.

[Detailed Structure of the Inhibit Flag Setting Process]

Figure 10:
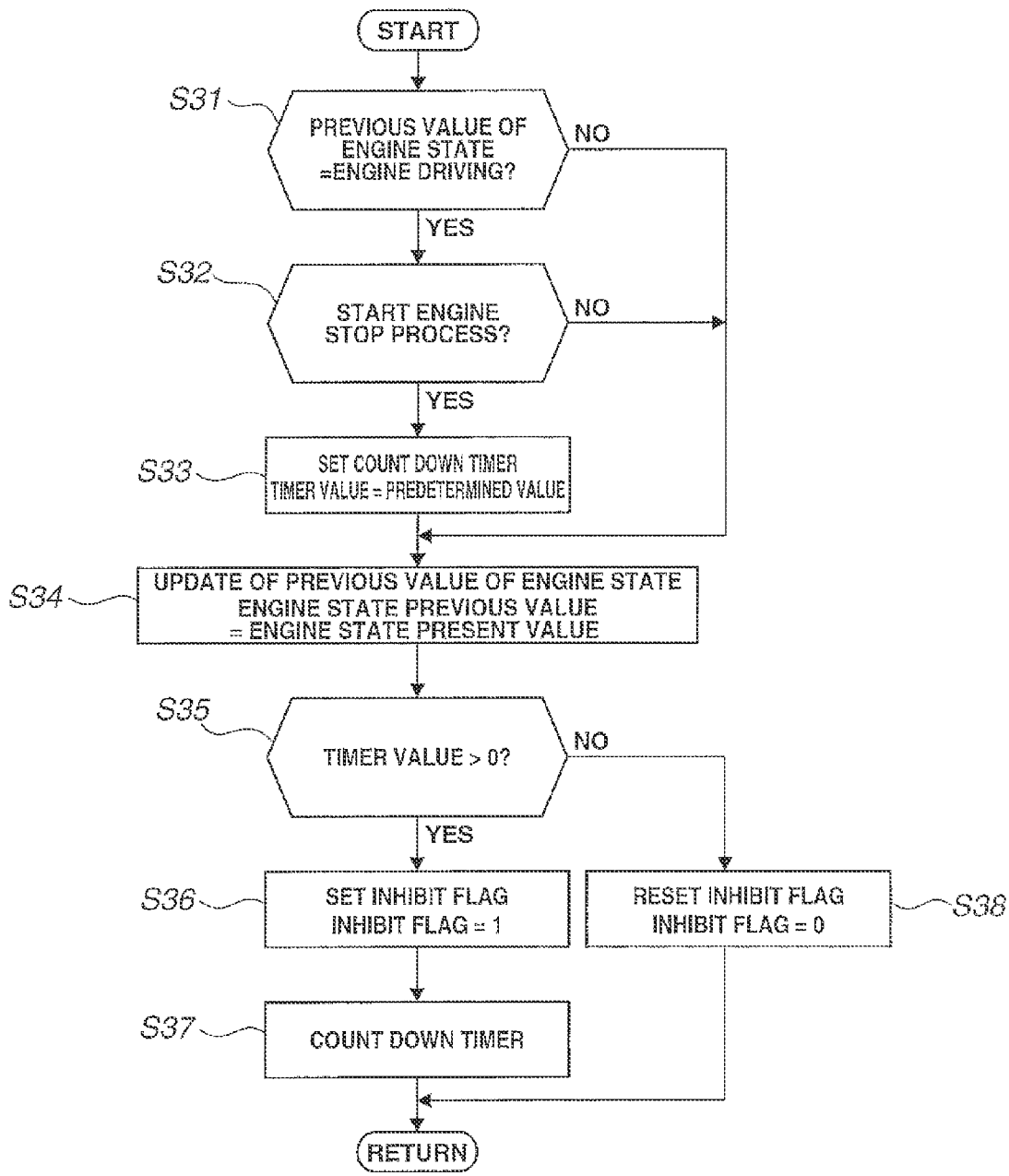
FIG. 10 is a flowchart representing a flow of the inhibit flag setting process executed in the AT controller in a third preferred embodiment.

FIG. 10 shows the flowchart representing the flow of the inhibit flag setting process executed in AT controller 7 in the third preferred embodiment. Each step of FIG. 10 representing the detailed structure of the inhibit flag setting process will be explained. It should be noted that, since each step of a step S33 and steps S35~S38 corresponds to step S13 and steps S15~S18 in FIG. 7, the explanation will herein be omitted.

At a step S31, AT controller 7 determines whether the previous value of an engine state is during an engine driving. If YES (the previous value of the engine state=during the engine driving), the routine goes to a step S32. If NO (previous value of the engine state during the engine driving), the routine goes to a step S34.

At step S32, AT controller 7 determines whether an engine stop process start signal is detected, subsequent to the determination at step S31 that the previous value of the engine state=during the engine driving. If YES (the detection that the engine stop process start signal), the routine goes to a step S33. If NO (no detection of the engine stop process start signal), the routine goes to a step S34.

At step S34, subsequent to the determination at step S31 that the previous value of the engine state≠during the engine driving, the determination at step S32 that the engine stop process start signal is not detected, or the setting at step S33 of the count down timer, the previous value of the engine state is updated and the routine goes to a step S35.

It should, herein, be noted that the previous value of the engine state is updated as follows: the previous value of the engine state=the present value of the engine state. Since the other structures are the same as those of FIGS. 1 through 6 in the first embodiment, the drawing indications and explanation will herein be omitted.

Next, the action of the third preferred embodiment will be explained.

[Inhibit Flag Setting Process Action]

As described above, when the mode switching from the HEV mode to the EV mode occurs, the inhibit flag is set to "1" according to the specific condition indicating the occurrence of the mode switching. The inhibit flag setting process action in the third preferred embodiment using the detection condition of the engine stop process start signal as the specific condition representing the mode switching will be explained.

On a basis of the mode switching from the HEV mode to the EV mode, when the condition that the previous value of the engine state=engine driving and the detection of the engine stop process start signal is established, in the flowchart in FIG. 10, the following flow is produced. Step S31→step S32→step S33→step S34→step S35→step S36→step S37→return.

At step S33, the count down timer is set to the predetermined value (timer value=predetermined value). At step S36, subsequent to the determination at step S35 that the timer value>0, the inhibit flag is set to "1" representing the inhibit of the engagement start determination.

Then, until the timer value indicates 0 from the subsequent control period, in the flowchart of FIG. 10, the flow of step S31→step S34→step S35→step S36→step S37→return is repeated and the inhibit flag=1 is maintained. Furthermore, when the timer value=0, in the flowchart of FIG. 10, the flow of step S31→step S34→step S35→step S38→return is repeated. At step S38, subsequent to the determination at step S35 that the timer value=0, the inhibit flag is reset to "0" (inhibit flag=0).

In the third preferred embodiment, before determination that second brake B2 has started the engagement and in a case where the engine stop process start signal is detected, the inhibit flag inhibiting the determination of the engagement start is set to "1" (inhibit flag=1).

That is to say, when the mode is switched from the HEV mode to the EV mode, the stop process of engine Eng is started. Therefore, when the engine stop process start signal is detected, the engagement start determination is inhibited. Thus, the variation of load of motor/generator MG which occurs due to the mode transition from the HEV mode to the EV mode can be prevented from the erroneous determination of the engagement start.

It should be noted that, since the other action is the same as the first preferred embodiment, the explanation thereof will be omitted.

Next, the effect will be explained. In the control apparatus for automatic transmission AT in the third preferred embodiment has the following effect.

(5) The determination inhibit means (step S2 in FIG. 6, FIG. 10) inhibits (step S36 in FIG. 10) the determination by the engagement start determining means before the determination that the frictional engagement element (second brake 62) starts the engagement and in a case of the detection that the stop process of engine Eng has started.

Therefore, in addition to the effect of (1) or (2), when the engine stop process of engine Eng is detected to be started, the determination of the engagement start is inhibited. Thus, the variation of the load of motor/generator MG which occurs due to the mode transition from the HEV mode to the EV mode can be prevented from the erroneous determination of the engagement start. That is to say, when the mode transition from the HEV mode to the EV mode occurs, the stop process of engine Eng is started. With this point in mind, the engagement start determination according to the MG torque variation quantity is inhibited.

As described above, the control apparatus for the automatic transmission according to the present invention has been explained on the basis of the first, second, and third preferred embodiments. However, the specific structure is not limited to these preferred embodiments. The design modifications and additions are allowed without departing from the gist of the invention related to the respective claims.

In the first preferred embodiment, as the determination inhibit means, determining the set of the inhibit flag on a basis of the commanded hydraulic pressure to first clutch CL1 is exemplified. However, as the determination inhibit means, an actual hydraulic pressure of first clutch CL1 is detected and the set of the inhibit flag may be determined on a basis of the actual hydraulic pressure of first clutch CL1.

In the third preferred embodiment, as the determination inhibit means, the inhibit flag is set to "1" (inhibit flag=1) when the engine stop process start signal is detected. However, as the determination inhibit means, the detection that the engine stop process of the engine is started may be based on when the engine torque is detected to be reduced.

In the first, second, and third preferred embodiments, as the engagement element interposed between the engine and the motor, normally closed type of first clutch CL1 which releases according to the addition of the hydraulic pressure is exemplified. However, as the engagement element interposed between the engine and the motor, a normal open type first clutch may be used which releases by releasing the hydraulic pressure.

In the first, second, and third preferred embodiments, the present invention is applicable to the hybrid vehicle in which an electrically driven oil pump S-O/P is equipped and an example in which a mechanically driven oil pump M-O/P, which is driven by means of the input shaft of automatic transmission, is not driven during the EV mode and the stop of the vehicle is shown.

However, the present invention is not limited to this. For example, in a vehicle in which the electrically driven oil pump is not installed and in which an input shaft revolution number is maintained at a constant revolution number by means of the motor driving the mechanical oil pump even in the EV mode and in the vehicle stop and the present invention is applicable to the transition from the HEV mode to the EV mode.

In the first, second, and third preferred embodiments, as the timer for the inhibit flag, a sufficient length of time is given for a time duration from a time at which the engine stop process is started to a time at which a complete explosion flag is extinguished (HEV→EV transition (1) phase). However, as the timer for the inhibit flag, a length of the timer may be set to the timer length such that the stroke determination and the stroke learning control based on the MG torque variation quantity are inhibited during the mode switch from the HEV mode to the EV mode.

In the first, second, and third preferred embodiments, the control apparatus for the automatic transmission according to the present invention is applied to the one motor and two clutch FR hybrid vehicle. However, the control apparatus for the automatic transmission is applicable to a one-rotor-and-two-clutch type FF hybrid vehicle or applicable to another type hybrid vehicle than the one-motor-two-clutch, for example, a parallel type hybrid vehicle having a power drive split mechanism. In summary, the present invention is applicable to an electrically driven vehicle in which the automatic transmission into which the driving forces from the driving sources including the engine and the motor are inputted is equipped in the drive train.

The invention claimed is:

1. A control apparatus for an automatic transmission into which driving forces from driving sources including an engine and a motor are inputted, the control apparatus comprising:
   a frictional engagement element engaged in a traveling range;
   engagement start determining means for determining that the frictional engagement element has started the engagement in a case where a load of the motor is increased by a predetermined quantity, during a revolution number control in which a revolution number of an input shaft of the automatic transmission is controlled to a predetermined target revolution number and when the traveling range is selected and the frictional engagement element in a release state is engaged; and
   determination inhibit means for inhibiting the determination by the engagement start determining means before the determination that the frictional engagement element has started the engagement and in a case where a switching from an HEV mode in which the driving forces from the engine and the motor are inputted to the input shaft to an EV mode in which the driving force of only the motor is inputted to the input shaft occurs.

2. The control apparatus for the automatic transmission as claimed in claim 1, wherein the determination inhibit means inhibits the determination by the engagement start determining means before the determination that the frictional engagement element has started the engagement and in a case where an engagement element interposed between the engine and the motor has started a release.

3. The control apparatus for the automatic transmission as claimed in claim 1, wherein the determination inhibit means inhibits the determination by the engagement start determining means before the determination that the frictional engagement element has started the engagement and in a case where a phase transition signal from the HEV mode to the EV mode is detected.

4. The control apparatus for the automatic transmission as claimed in claim 1, wherein the determination inhibit means inhibits the determination by the engagement start determining means before the determination that the frictional engagement element has started the engagement and in a case where a detection that a stop process of the engine has started is made.

5. The control apparatus for the automatic transmission as claimed in claim 1, wherein the control apparatus further comprises: inhibit time hydraulic pressure setting means for setting a commanded hydraulic pressure for the frictional engagement element to a commanded hydraulic pressure which is higher than a case where not inhibited during a predetermined interval of time in a case where the determination is inhibited by the determination inhibit means.

6. A control apparatus for an automatic transmission into which driving forces from driving sources including an engine and a motor are inputted, the control apparatus comprising:
   a frictional engagement element engaged in a traveling range;
   an engagement start determining section configured to determine that the frictional engagement element has started the engagement in a case where a load of the motor is increased by a predetermined quantity, during a revolution number control in which a revolution number of an input shaft of the automatic transmission is controlled to a predetermined target revolution number and when the traveling range is selected and the frictional engagement element in a release state is engaged; and
   a determination inhibit section configured to inhibit the determination by the engagement start determining section before the determination that the frictional engagement element has started the engagement and in a case where a switching from an HEV mode in which the driving forces from the engine and the motor are inputted to the input shaft to an EV mode in which the driving force of only the motor is inputted to the input shaft occurs.

7. The control apparatus for the automatic transmission as claimed in claim 6, wherein the determination inhibit section inhibits the determination by the engagement start determining section before the determination that the frictional engagement element has started the engagement and in a case where an engagement element interposed between the engine and the motor has started a release.

8. The control apparatus for the automatic transmission as claimed in claim 6, wherein the determination inhibit section inhibits the determination by the engagement start determining section before the determination that the frictional engagement element has started the engagement and in a case where a phase transition signal from the HEV mode to the EV mode is detected.

9. The control apparatus for the automatic transmission as claimed in claim 6, wherein the determination inhibit section inhibits the determination by the engagement start determining section before the determination that the frictional engagement element has started the engagement and in a case where a detection that a stop process of the engine has started is made.

10. The control apparatus for the automatic transmission as claimed in claim 6, wherein the control apparatus further comprises: an inhibit time hydraulic pressure setting section configured to set a commanded hydraulic pressure for the frictional engagement element to a commanded hydraulic pressure which is higher than a case where not inhibited during a predetermined interval of time in a case where the determination is inhibited by the determination inhibit section.

11. A control method for an automatic transmission into which driving forces from driving sources including an engine and a motor are inputted, the control method comprising:
 providing a frictional engagement element engaged in a traveling range;
 determining that the frictional engagement element has started the engagement in a case where a load of the motor is increased by a predetermined quantity, during a revolution number control in which a revolution number of an input shaft of the automatic transmission is controlled to a predetermined target revolution number and when the traveling range is selected and the frictional engagement element in a release state is engaged; and
 inhibiting the determination before the determination that the frictional engagement element has started the engagement and in a case where a switching from an HEV mode in which the driving forces from the engine and the motor are inputted to the input shaft to an EV mode in which the driving force of only the motor is inputted to the input shaft occurs.

* * * * *